United States Patent
Choi

(10) Patent No.: US 9,577,241 B2
(45) Date of Patent: Feb. 21, 2017

(54) APPARATUS FOR PREVENTING OVERCHARGE OF BATTERY

(71) Applicant: Hyundai Mobis Co., Ltd., Seoul (KR)

(72) Inventor: Chang Youl Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 42 days.

(21) Appl. No.: 14/488,457

(22) Filed: Sep. 17, 2014

(65) Prior Publication Data

US 2015/0140390 A1 May 21, 2015

(30) Foreign Application Priority Data

Nov. 21, 2013 (KR) .......................... 10-2013-0141835

(51) Int. Cl.
*H01M 6/36* (2006.01)
*H01M 2/34* (2006.01)
*H01M 2/20* (2006.01)

(52) U.S. Cl.
CPC ............. *H01M 2/345* (2013.01); *H01M 2/206* (2013.01); *H01M 2200/20* (2013.01); *H01M 2220/20* (2013.01)

(58) Field of Classification Search
CPC .......................... H01M 2200/20; H01M 2/345
See application file for complete search history.

(56) References Cited

U.S. PATENT DOCUMENTS

| 5,770,994 A * | 6/1998 | Evans ................... H01H 85/10 337/159 |
| 2008/0118824 A1* | 5/2008 | Oguma ............... H01M 2/0207 429/121 |
| 2013/0216871 A1* | 8/2013 | Lee .................... H01M 2/0413 429/62 |

FOREIGN PATENT DOCUMENTS

KR 10-2011-0008480 A 1/2011

OTHER PUBLICATIONS

Korean Office Action mailed Oct. 29, 2014 in counterpart Korean Application No. 10-2013-0141835 (5 pages, in Korean).

* cited by examiner

*Primary Examiner* — Patrick Ryan
*Assistant Examiner* — Ben Lewis
(74) *Attorney, Agent, or Firm* — NSIP Law

(57) ABSTRACT

The present invention relates to an apparatus for preventing overcharge of a battery, and more particularly, to an apparatus for preventing overcharge of a battery, which interrupts power of the battery by inducing a fracture of a busbar to prevent overcharge and to this end, provided is an apparatus for preventing overcharge of a battery, including: a battery cell; an electrode tab extended from both sides of the battery cell and constituted by a negative tab and a positive tab; and a busbar connecting the negative tab and the positive tab, wherein the busbar has a cut part fractured by expansion of the battery cell.

7 Claims, 3 Drawing Sheets

APPARATUS FOR PREVENTING OVERCHARGE OF BATTERY

CROSS-REFERENCE TO RELATED APPLICATION

This application claims priority to and the benefit of Korean Patent Application No. 10-2013-0141835 filed in the Korean Intellectual Property Office on Nov. 21, 2013, the entire contents of which are incorporated herein by reference.

TECHNICAL FIELD

The present invention relates to an apparatus for preventing overcharge of a battery, and more particularly, to an apparatus for preventing overcharge of a battery, which interrupts power of the battery by inducing a fracture of a busbar to prevent overcharge.

BACKGROUND OF THE INVENTION

In general, a high-voltage battery is used in an electric vehicle or a fuel battery vehicle as well as a hybrid vehicle to supply electric energy for driving a vehicle.

In the high-voltage battery, a battery package is configured, which may generate high voltage by connecting a plurality of unit batteries or modules and high power is generated by using the configured battery package.

A rectangular or pouch type battery which may be stacked with high integration and has a small weight compared to a capacity is primarily used for the battery pack, and lithium ion batteries that provide high power compared to the capacity are a lot used as the unit battery (battery cell) of the battery package.

However, the lithium ion battery has a problem that safety is fundamentally low, and the pouch type battery has a problem that mechanical rigidity of a battery case is low and when a sealed part is separated, an ignitable substance such as an electrolyte leaks, and as a result, a risk of fire is high.

In particular, since the electrolyte is injected into the cell, when the battery is overcharged, voltage is increased and the electrolyte in the cell is resolved due to overheat and combustible gas is thus internally generated in the cell, and as a result, a swelling phenomenon in which a pouch itself is expanded occurs. Therefore, ignition and explosion risks of the battery are increased.

Therefore, a technology for forcibly cutting off the power of the battery is proposed when the swelling phenomenon occurs due to the overcharge of the battery.

SUMMARY OF THE INVENTION

The present invention has been made in an effort to provide an apparatus for preventing overcharge of a battery, which can prevent overcharge by fracturing a cut part formed in a busbar when the battery is expanded due to generation of gas in the battery when the battery is overcharged.

An exemplary embodiment of the present invention provides an apparatus for preventing overcharge of a battery, including: a battery cell; an electrode tab extended from both sides of the battery cell and constituted by a negative tab and a positive tab; and a busbar connecting the negative tab and the positive tab, wherein the busbar has a cut part fractured by expansion of the battery cell.

The apparatus for preventing overcharge of a battery may further include a fracture part capable of fracturing the cut part.

One end of the fracture part may contact the cut part and the other end may be provided in the battery cell to press the cut part when the battery cell is expanded.

The cut part may be formed in a dotted line shape in a width direction of the busbar.

The thickness of the cut part that contacts the fracture part may be smaller than the thickness of the cut part that does not contact the fracture part.

The fracture part may be made of a nonconductor material.

Covers may be provided in upper and lower parts of the busbar, respectively in order to restrict movement of the busbar.

According to exemplary embodiments of the present invention, in an apparatus for preventing overcharge of a battery, a dotted line shaped cut part is formed in a busbar that supplies power to a battery cell and a fracture part presses and fractures the cut part when a battery is expanded, and as a result, overcharge can be prevented by cutting off power supply to the battery.

DETAILED DESCRIPTION OF THE EMBODIMENTS

Figure 1:
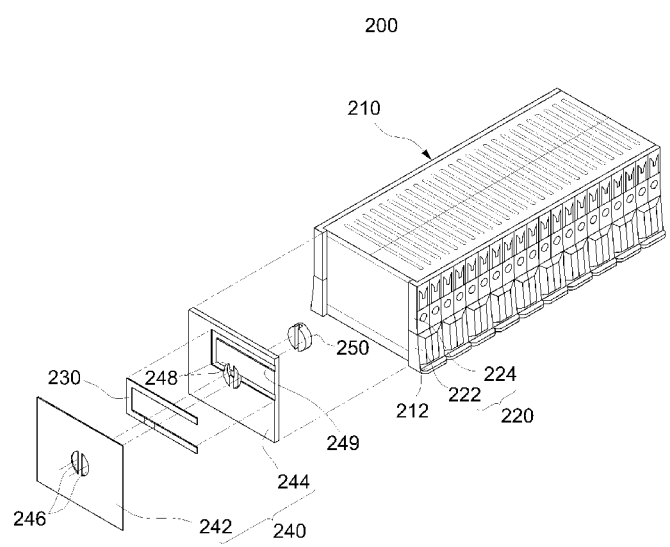
FIG. 1 is a perspective view illustrating an apparatus for preventing overcharge of a battery according to an exemplary embodiment of the present invention.

Hereinafter, exemplary embodiments of the present invention will be described in detail with reference to the accompanying drawings and contents to be described below. However, the present invention is not limited to exemplary embodiments described herein and may be implemented in other forms. On the contrary, exemplary embodiments introduced herein are provided to make disclosed contents thorough and complete and sufficiently transfer the spirit of the present invention to those skilled in the art. Like reference numerals refer to like elements throughout the specification.

Figure 2:
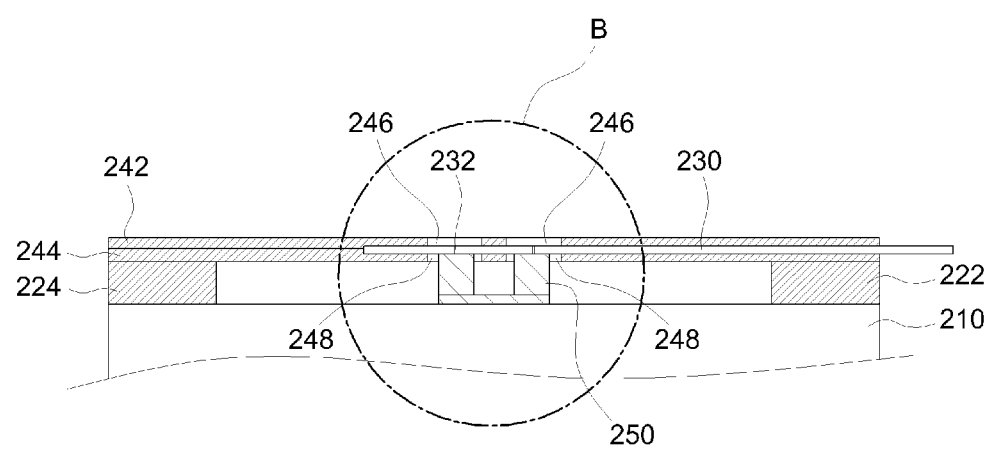
FIG. 2 is a cross-sectional view taken along line A-A of FIG. 1.
Figure 3:
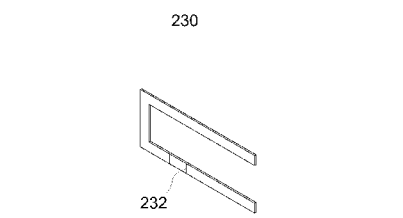
FIG. 3 is a perspective view illustrating a busbar according to an exemplary embodiment of FIG. 1.
Figure 3:
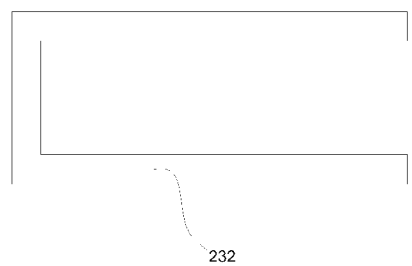
Figure 4:
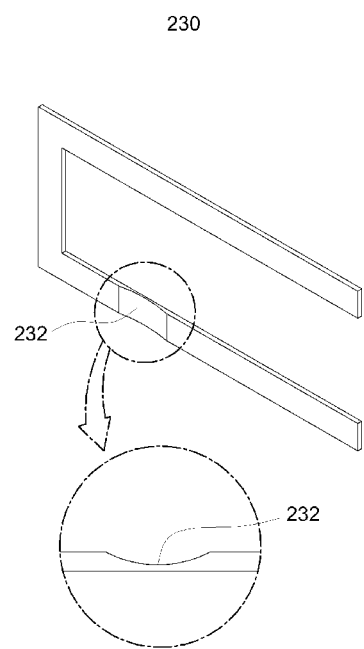
FIG. 4 is a perspective view illustrating a busbar according to another exemplary embodiment of FIG. 1.
Figure 5:
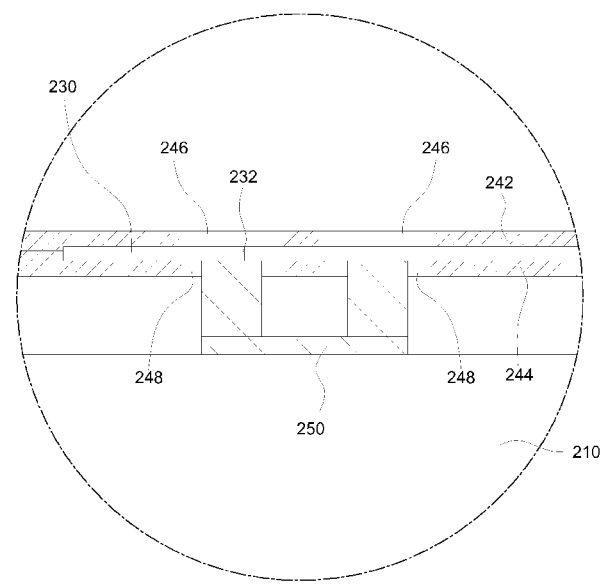
FIG. 5 is an enlarged diagram of part B of FIG. 2.

FIG. 1 is a perspective view illustrating an apparatus for preventing overcharge of a battery according to an exemplary embodiment of the present invention. FIG. 2 is a cross-sectional view taken along line A-A of FIG. 1. FIG. 3 is a perspective view illustrating a busbar according to the exemplary embodiment of FIG. 1. FIG. 4 is a perspective view illustrating a busbar according to another exemplary embodiment of FIG. 1. FIG. 5 is an enlarged diagram of part B of FIG. 2.

As illustrated in FIGS. 1 and 2, the apparatus 200 for preventing overcharge of a battery includes a battery module 210, an electrode tab 220, a busbar 230, a cover 240, and a fracture part 250.

The battery module 210 is formed by stacking a plurality of battery cells 212 in a plate shape to be electrically connected.

The electrode tab 220 is constituted by a negative tab 222 and a positive tab 224 and each of the electrode tabs 220 is extended in one direction from the battery cells 212.

The cover 240 has a flat panel shape and prevents the busbar 230 from being stretched in fracture and simultaneously, restricts movement of the busbar 230.

The cover 240 is constituted by an upper cover 242 and a lower cover 244, and is provided on the top of the electrode tab 220.

Holes 246 and 248 are formed at the centers of the upper and lower covers 242 and 244, and the holes 246 and 248 provide a space into which a fracture part 250 is inserted so as for the fracture part 250 to press the busbar 230, and a groove 249 corresponding to a shape of the busbar 230 is formed on the top surface of the lower cover 244.

The busbar 230 is interposed between the upper cover 242 and the lower cover 244 in a "⊏" shape and installed at the groove 249 of the lower cover 244 corresponding to the shape of the busbar 230.

A cut part 232 fractured by the expansion of the battery module 210 is provided in the busbar 230 and in particular, the cut part 232 is formed in parts of the busbar 230, which are positioned at the holes 246 and 248 of the upper and lower covers 242 and 244, on a front surface of the busbar 230.

Meanwhile, it is described and illustrated that the busbar 230 has the "⊏" shape in the detailed description of the present invention and in FIGS. 1 and 2, but the present invention is not limited thereto. In other words, the cut part is just formed and fractured on the busbar regardless of the shape of the busbar.

The fracture part 250 is installed to facilitate the fracture of the cut part 232, and one end of the fracture part 250 contacts the cut part 232 and the other end is provided at one side of the battery module 210.

More specifically, the fracture part 250 is positioned to correspond to the hole of the lower cover 244 and in this case, the fracture part 250 contacts the cut part 232 positioned at an upper portion hole of the lower cover 244 through the hole 248.

Herein, the cut part 232 may be formed in a dotted line shape in a width direction of the busbar 230 as illustrated in FIG. 3 and alternatively, the thickness of the cut part 232 that contacts the fracture part 250 may be smaller than the thickness of the cut part 232 that does not contact the fracture part 250 as illustrated in FIG. 4.

Herein, the upper and lower covers 242 and 244 and the fracture part 250 may be made of a polymer nonconductor material including polypropylene.

Figure 6:
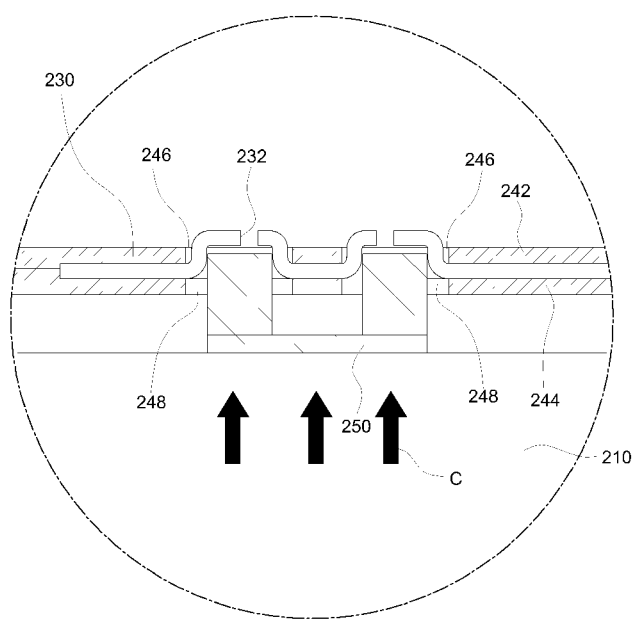
FIG. 6 is a diagram illustrating an operational state of the apparatus for preventing overcharge of a battery according to an exemplary embodiment of the present invention.

FIG. 6 is a diagram illustrating an operational state of the apparatus for preventing overcharge of a battery according to an exemplary embodiment of the present invention.

As illustrated in FIG. 6, when the battery module 210 is overcharged while the battery module 210 is charged, the temperature of the battery cell 212 is increased while the battery cell 212 emits heat, and as a result, the battery cell 212 is expanded while gas is generated in the battery cell 212.

The fracture part 250 joined to the front of the battery module 210 moves in a direction (arrow C) at which the lower case 244 is positioned by the expansion of the battery cell 212 and the fracture part 250 penetrates the hole 248 of the lower case 244.

Thereafter, the fracture part 250 presses the cut part 232 that contacts one side of the fracture part 250 and since the cut part 232 is formed in the dotted line shape, the cut part 232 is easily cut by force applied by the fracture part 250, and as a result, power of the battery module 210 is cut off and further overcharging is prevented.

Accordingly, a dotted line shaped cut part is formed in a busbar that supplies power to a battery cell and a fracture part presses and fractures the cut part when a battery is expanded, and as a result, overcharge can be prevented by cutting off power supply to the battery.

As described above, although the apparatus for preventing overcharge of a battery according to the present invention has been described with reference to the exemplary embodiments of the present invention, it is apparent to those skilled in the art that modifications, changes, and various modified exemplary embodiments can be made without departing from the spirit of the present invention.

What is claimed is:

1. An apparatus for preventing overcharge of a battery, the apparatus comprising:
    a battery cell;
    an electrode tab extending from both sides of the battery cell and comprising a negative tab and a positive tab;
    a busbar connecting the negative tab and the positive tab and comprising a cut part configured to be fractured, in response to expansion of the battery cell;
    a fracture part capable of fracturing the cut part; and
    upper and lower covers are configured to restrict movement of the busbar, the upper and lower covers being positioned adjacent to the busbar,
    whereon at least one of the covers comprises holed to receive portions of the fracture part.

2. The apparatus of claim 1, wherein one end of the fracture part contacts the cut part and another end of the fracture part adjoins the battery cell so as to press the cut part, in response to the battery cell being expanded.

3. The apparatus of claim 2, wherein the cut part comprises a dotted line extending in a width direction of the busbar.

4. The apparatus of claim 2, wherein the cut part comprises a portion having a thickness less than a remainder of the cut part and contacting the fracture part.

5. The apparatus of claim 1, wherein the fracture part comprises a non-conductive material.

6. The apparatus of claim 5, wherein the non-conductive material comprises polypropylene.

7. The apparatus of claim 1, wherein at least one of the covers comprises a groove corresponding to a shape of the busbar and is configured to receive the busbar.

* * * * *